United States Patent [19]

Dewald et al.

[11] Patent Number: 5,520,589
[45] Date of Patent: May 28, 1996

[54] DIFFERENTIAL

[75] Inventors: Gregory T. Dewald, Mooresville; Charles D. Schaber, Statesville, both of N.C.

[73] Assignee: Clark Equipment Company, South Bend, Ind.

[21] Appl. No.: 482,418

[22] Filed: Jun. 7, 1995

Related U.S. Application Data

[63] Continuation of Ser. No. 136,303, Oct. 14, 1993.

[51] Int. Cl.⁶ .................................................. F16H 48/06
[52] U.S. Cl. .......................... 475/231; 475/86; 475/160; 475/238
[58] Field of Search ............................... 475/84, 86, 88, 475/159, 160, 231, 237, 238; 192/3.52, 113.1, 113.3, 113.34, 113.35, 113.5; 184/6.12, 11.2

[56] References Cited

U.S. PATENT DOCUMENTS

| | | |
|---|---|---|
| 2,913,928 | 6/1957 | Double . |
| 2,965,181 | 12/1960 | Senkowski ................................. 172/3 |
| 3,138,970 | 6/1964 | Costa et al. ................................ 74/711 |
| 3,182,527 | 5/1965 | Bryan . |
| 3,448,635 | 6/1969 | Nelson . |
| 3,741,343 | 6/1973 | Lindenfeld et al. .................. 184/11 A |
| 3,762,503 | 10/1973 | Wilder et al. ............................. 475/160 |
| 3,913,414 | 10/1975 | Frelburger . |
| 3,923,133 | 12/1975 | Chivari . |
| 3,974,717 | 8/1976 | Breed et al. . |
| 4,041,804 | 8/1977 | Clark . |
| 4,245,525 | 1/1981 | LeBeque . |
| 4,263,824 | 8/1981 | Mueller . |
| 4,319,499 | 3/1982 | Sanui et al. ........................ 475/159 X |
| 4,679,463 | 7/1987 | Ozaki et al. . |
| 4,732,052 | 3/1988 | DeWald . |
| 4,955,853 | 9/1990 | Bausch ................................ 475/231 X |
| 5,024,634 | 6/1991 | Blessing . |

Primary Examiner—Charles A. Marmor
Assistant Examiner—Peter Kwon
Attorney, Agent, or Firm—Watts, Hoffmann, Fisher & Heinke

[57] ABSTRACT

An improved locking differential for driving a pair of vehicle axles. The differential includes a rotatable case. A differential pinion is supported by the case and meshes with side gears to drive the axles. A clutch assembly is carried by the case and connects the side gear with the case upon actuation. Fluid power actuates the clutch assembly to connect the case and side gear. The improvement comprises the fluid power means having a seal retainer which encircles a portion of the case. The seal retainer has a system for evenly distributes forces applied to the axially extending portion of the case during delivery of pressurized fluid to the clutch assembly to minimize relative movement between the seal retainer and the case. The system comprises oppositely facing surfaces formed in the seal retainer being substantially equal in area to offset oppositely directed forces acting within the seal retainer when pressurized fluid is communicated to the clutch assembly.

17 Claims, 6 Drawing Sheets

DIFFERENTIAL

This is a continuation of Ser. No. 136,303, filed Oct. 14, 1993.

BACKGROUND OF THE INVENTION

1. Technical Field

The present invention relates generally to a differential for driving vehicle axles and, in particular, to a fluid actuated locking type differential.

2. Description of the Prior Art

Differentials for driving axles are known and typically include a set of gears coupled between two half axles. Such a differential enables the driven axles of the vehicle to rotate at different speeds and equal driving force can be transmitted to driving wheels associated with each axle. Under certain conditions, the differential has a disadvantage if one drive wheel is on a slippery surface, such as ice or mud. The wheel on the slippery surface will slip and spin because its associated tire cannot grip the surface.

A limited slip differential was designed to improve the traction of a vehicle wheel on the slippery surface. This is done by allowing the differential to transmit torque to the axles in unequal amounts without interfering with the differential action on turns. The most common limited slip differential is a friction type which has clutch assemblies mounted between the two side gears and the differential case. Clutch assemblies transfer torque from the slipping and faster spinning wheel to the slow spinning good traction wheel. Typically the clutch assembly has disks that are splined to the side gear and has plates that fit into the differential case. The disks rotate with the side gear and the plates rotate with the case.

A locking differential was developed to overcome a limited ability on the part of the limited slip differential to transfer torque between axles. Such locking differential typically includes a fluid actuated piston for applying force to a clutch assembly located between case and a side gear. Pressurized fluid is provided to a piston cavity by means of at least one radially extending passage formed in a differential case half which leads to an opening on the outer surface of the case half hub. A ring-shaped manifold is fitted external to the case half and suitably mounted so that it does not rotate to deliver fluid to the opening in the case half.

The fluid is typically pressurized to a relatively high pressure which acts on all passage surfaces in the manifold and case half. The fluid pressure acting on the surfaces often causes a relative cocking or misalignment between the manifold and case half which can cause premature wear and even failure of the manifold, case half or seals located therebetween.

The fluid used to actuate the piston is typically different than a lubricant located in a housing for the differential which is used to cool and lubricate gears and bearings of the differential. Thus, it is very desirable to maintain the actuating fluid separate from the differential lubricant. If the seals wear prematurely due to the relative misalignment between the manifold and case half or fluid leakage occurs for other reasons, mixing of the actuating fluid and differential lubricant can occur and degrade the lubricant.

SUMMARY OF THE INVENTION

The present invention is directed to an improved differential gearing mechanism for driving a pair of vehicle axles. Some features of the present invention are directed to any type of differential. These features relate to cooling and lubrication of the differential gears and to grease lubrication and seal structure between the housing and a drive pinion flange portion. Other features are directed to a fluid actuated locking differential in which, under certain circumstances, axles connected with the differential are locked to rotate in unison about a common axis as a single drive member. These features relate to balancing forces during the fluid actuation of a locking mechanism and to draining the fluid used to actuate the locking mechanism so it does not mix with gear lubricant in a differential housing.

An improved locking differential embodying the present invention is for driving a pair of vehicle axles. The differential includes a rotatable case, a differential pinion supported by the case and meshing with side gears to drive the axles. A clutch assembly is carried by the case and connects the side gears with the case upon actuation to drive the axles in unison. Fluid power actuates the clutch assembly to connect the case and side gears. The improvement comprises the fluid power means having a seal retainer encircling an axially extending portion of the case for communicating fluid to the clutch assembly. The seal retainer has a system for evenly distributing forces applied to the axially extending portion of the case during delivery of pressurized fluid to said seal retainer. The even force distributing system includes oppositely facing surfaces formed in the seal retainer being substantially equal in area to offset any oppositely directed forces acting within said seal retainer when fluid pressure is communicated to said seal retainer.

Another feature of the locking differential includes the seal retainer having four annular grooves which are axially spaced apart. An annular seal is located in a respective one of the annular grooves in the seal retainer. The seals engaged the axial extending portion of the case. A first fluid passage extends through the seal retainer and is located between an intermediate pair of the seals to conduct pressurized fluid to the clutch assembly. A second fluid passage extends through the seal retainer and has end portions located between respective pairs of axially outermost seals for draining any fluid leakage axially outward of said intermediate pair of seals to tank. Yet another feature of the locking differential includes a spring mechanism for biasing a piston in the clutch towards an actuated condition. The spring mechanism may be at least one belville spring located between the piston and the case or a plurality of coil springs each of which is located between the piston and the case. The location of the mean radius of the spring mechanism is at the mean radius of the piston.

A feature of the present invention is an improvement that can be used with any type of differential having a case supported for rotation in a housing. The case carries a ring gear. A rotatable drive pinion is supported by the housing and is in meshing engagement with the ring gear. A cross-shaft is supported by the case and receives a differential pinion which meshes with a side gear to drive one of the axles. A clutch assembly is carried by the case and connects the side gear with the case upon actuation. Fluid power actuates the clutch assembly to connect the case and side gear. The improvement comprises a first system for lubricating and cooling the engageable surfaces of the clutch assembly at low rotational speed of the drive pinion. A second system for lubricating and cooling the engageable surfaces of the clutch assembly at high rotational speed of the drive pinion, the second means utilizing lubricant thrown off from the drive pinion during rotation.

The first system includes a passage in the case conducting lubricant located in a reservoir defined by the housing to the clutch assembly. The clutch assembly includes at least one plate having a plurality of inwardly projecting teeth for splined engagement and connection with the side gear and at least one radial cutout of a radius greater than the largest radius of the teeth. The cutout permits lubricant to flow through the clutch assembly to an exhaust passage in the case and to an area adjacent the meshing surfaces of the drive pinion and ring gear in the reservoir.

The second system includes a passage in the housing for conducting lubricant thrown off from the drive pinion to a bearing retaining member. The retaining member has a passage extending therethrough for conducting the lubricant to a bearing which supports a portion of the case. The bearing conducts and pumps the lubricant to a passage formed in the case. The passage in the case conducts the lubricant to an area adjacent the meshing surfaces of the differential pinion and side gear, through another passage in the differential case to a radial cutout in the friction plate, through the clutch assembly and to the reservoir.

Another feature of the present invention includes three annular seals located between a rotatable drive pinion flange and the housing. A passage has an end portion located between a pair of said seals. A wear sleeve is connected to the flange for the seals to engage. A fitting communicates with the passage for introducing lubricant between the wear sleeve and the housing. An annular thrust washer is located axially outward of an axial outermost seal. A slinger is located axially outward of the thrust washer. A dust shield is located axially and radially outward of at least a portion of said slinger.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENTS

A locking type differential 20 (FIG. 1) for driving a pair of vehicle axle shafts 22 in unison, under certain circumstances, is installed in a housing 24 for the differential and axle shafts. Such a vehicle could be an automobile, car, truck, tractor, tow motor, lift truck, or the like. The housing 24 includes a pair of mounting pads 42 for attaching the housing to a vehicle frame or suspension. The axle shafts 22 are supported to rotate about a common axle axis A at outer end portions in the housing 24 (not shown) and at inner ends by a portion of the differential 20.

The housing 24 receives pinion support bearings 44, 46 for supporting a drive pinion 48 to rotate relative to the housing about a pinion axis B. The drive pinion 48 has an end portion for receiving a pinion flange 62 in splined engagement. The pinion flange 62 connects the differential 20 and axle shafts 22 with a drive train component of the vehicle, such as a drive shaft or transmission. The pinion flange 62 is maintained in engagement with the drive pinion 48 by a nut 64 threaded onto an axial end portion of the pinion gear 48. The drive pinion 48 is in meshing engagement with a bevel ring gear 82. Upon rotation of the pinion 48 about the axis B, a driving force is applied to the ring gear 82 to rotate about the axle axis A.

A pair of bearings 84 are received in the housing 24 to receive and support a differential case 86 for rotation about the axis A. The ring gear 82 is attached to the differential case 86 by suitable fastening means, such as bolts. Rotation of the pinion gear 48, thus, also causes rotation of the differential case 86 about the axis A.

The differential case 86 is made up of three parts connected together by suitable means, such as by bolts. The differential case 86 includes a first differential case half 102, a second differential case half 104 and a clutch housing 106. The first differential case half 102 is located to the right, as viewed in FIG. 2. The second differential case half 104 is located to the left, as viewed in FIG. 2. The clutch housing 106 is located between the first and second differential case halves 102, 104.

The first differential case half 102 is fastened directly to the clutch housing 106. The second differential case half 104 is also fastened to the clutch housing 106. Bearing retaining members 122, 124, such as bearing nuts, retain the bearings 84 from axial movement relative to the housing 24 and thereby maintain the differential case 86 from radial and axial movement. The bearing retaining members 122, 124 are in the threaded engagement with the housing 24. Bolts 126 are threaded into the housing 24 to prevent rotation and loosening of the bearing retaining members 122, 124 relative to the housing. The left bolt 126, as viewed in FIG. 2, extends into a radial opening in the bearing nut 122 to prevent rotation. The right bolt 126, as viewed in FIG. 2, retains a tang 127 which enters a radial slot in an axial end of the bearing nut 124 to prevent rotation.

The assembled differential case 86 receives and supports a cross shaft 142. The ends of the cross shaft 142 are received in the differential case 86 and the cross shaft rotates with the differential case about the axis A. The cross shaft 142 may have two or four ends. Each end of the cross shaft 142 receives a differential pinion 144. A needle roller bearing 146 is located between each differential pinion 144 and the cross-shaft 142 to permit the differential pinion to rotate relatively freely about the cross shaft. Each differential pinion 144 meshingly engages a pair of side gears 162, 164. Each side gear 162, 164 is in splined engagement with a respective axle shaft 22. Upon the rotation of the differential case about the axis A, each side gear 162, 164 rotates an axle shaft 22 about the axis A to drive the vehicle to which the differential 20 is mounted.

When in an unlocked condition, the differential 20 permits the axle shafts 22 to rotate relative to one another or at different speeds about the axis A. When in a locked condition, the differential 20 forces the axle shafts 22 to rotate at the same speed or in unison about the axis A. The axle shafts 22 relatively rotate under certain conditions, such as when the vehicle is turning or when one of the vehicles wheels connected to the axle shafts have more traction than the other wheel. When the differential 20 is in a locked condition, the side gears 162, 164 are fixed to the differential case 86 and rotate with the differential case. When the differential 20 is in an unlocked condition, the side gears 162, 164 may rotate relative to the differential case 86.

Located between each of the side gears 162, 164 and the clutch housing 106 or the first differential case half 102, respectively, is an annular thrust washer 172. The thrust washer 172 serves to prevent excessive wear between the relatively rotating side gears 162, 164 and the clutch housing 106 or first differential case half 102, when the differential 20 is in an unlocked condition. The thrust washer 172 is made from hardened steel which is harder and more wear resistant than the side gears 162, 164, clutch housing 106 and differential case halves 102, 104 which are made from ductile iron. Each thrust washer 172 is non-rotatably held in place by a pair of dowel pins 174 closely fitted in holes in the thrust washer and the clutch housing 106 or first differential case half 102. Thus, wear of the ductile iron components is minimized because they do not engage one another.

A clutch assembly 182 is actuatable in order to connect and fix the differential case 86 to the side gears 162, 164. The clutch assembly 182 is actuatable by fluid power from a source external to the housing 24. The fluid power source typically has a fluid pump 226 (FIG. 3) for supplying fluid under relatively high pressure to the clutch assembly 182. The fluid used to actuate the clutch assembly 182 and other hydraulic components on the vehicle is typically different than the gear lube in a sump defined by the housing 24. Thus, it is very desirable to maintain the fluid separate from the gear lube.

The housing 24 defines a sump reservoir chamber 180 for storing and holding a lubricating fluid, such as gear lube of a relatively high viscosity rating, for the drive and differential gears. It is desirable to keep the gear lube in the sump 180 separated from the fluid delivered by the external source. This is desirable so the different viscosity lubricants are not intermixed which could degrade both lubricants from their intended use.

Figure 10:
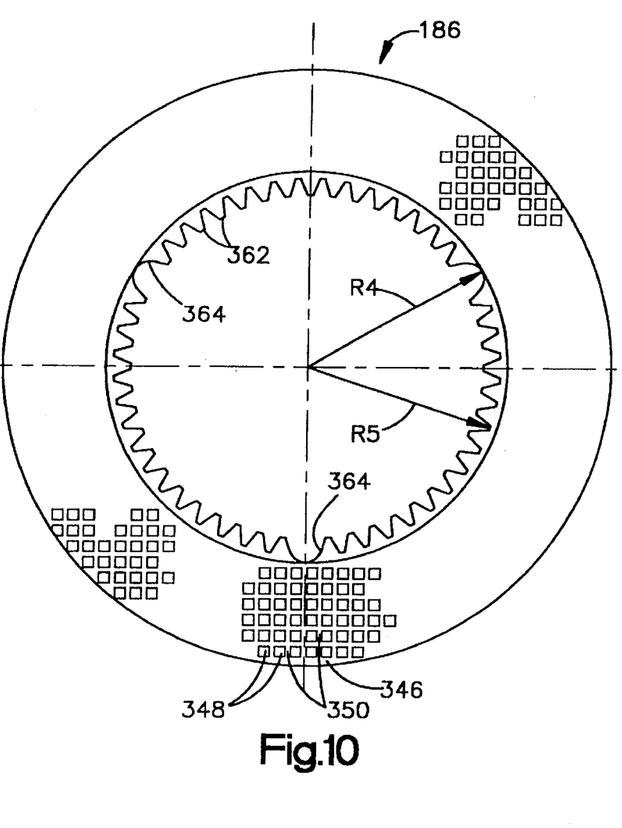
FIG. 10 is an enlarged side view of a clutch plate of the differential.

The clutch assembly 182 includes a plurality of reaction plates 184 having radially outward extending teeth in engagement with radially inwardly extending splines from the clutch housing 106. The reaction plates 184, thus, are fixed to rotate with the clutch housing 106. A plurality of friction plates 186 have a plurality of radially inward projecting teeth (FIG. 10) for engagement with a clutch driver 188. The clutch driver 188 is splined to rotate with the side gear 162 and is axially movable relative to the side gear. The clutch driver 188 is used to minimize stress that would occur in the teeth of the friction plates 186 if the clutch drive was not used but a relatively smaller inside diameter of the friction plates or relatively larger outside diameter of the side gear 162, or both, were used.

Each friction plate 186 is disposed between a pair of axially spaced part reaction plates 184. When a relatively large axial force is applied to force the axially leftmost reaction plate 184 to move to the right, as viewed in FIG. 2, the reaction plates 184 frictionally engage the friction plates 186 and force the clutch driver 188 and the associated side gear 162 into fixed connection with the differential case 86. Rotation and locking of the right side gear 164, as viewed in FIG. 2, to the differential case 86 also occurs. Thus, the axles 22 are driven to rotate in unison.

An axially extending annular opening 200 in the left differential case half 104 receives an annular piston 202. The annular piston 202 has a generally U-shaped cross-section taken in a radial plane and having a bight portion connecting a pair of axially extending walls. The mean radius R1 of the piston 202 is approximately the same as the mean radius R2 of the clutch assembly 182. The "mean radius" is defined herein as to the center of a radially extending portion of that component.

The piston 202 is axially movable in the opening 200 to apply an axial force to the clutch assembly 182 and effect locking of the side gears 162, 164 to the differential case 86. The piston 202 is axially movable under a fluid pressure communicated to the opening 200 from the external source. Outer annular seal 204 and inner annular seal 206 seal the respective outer and inner peripheries of the piston 202 and prevent actuating fluid to mix with the lubricating fluid located in the housing sump 180. Biasing spring 208 biases the piston 202 towards the clutch assembly 182 with a relatively large force to provide limited slip differentiation at all times, but not great enough to effect locking of the side gears 162, 164 to the differential case 86.

Figure 1:
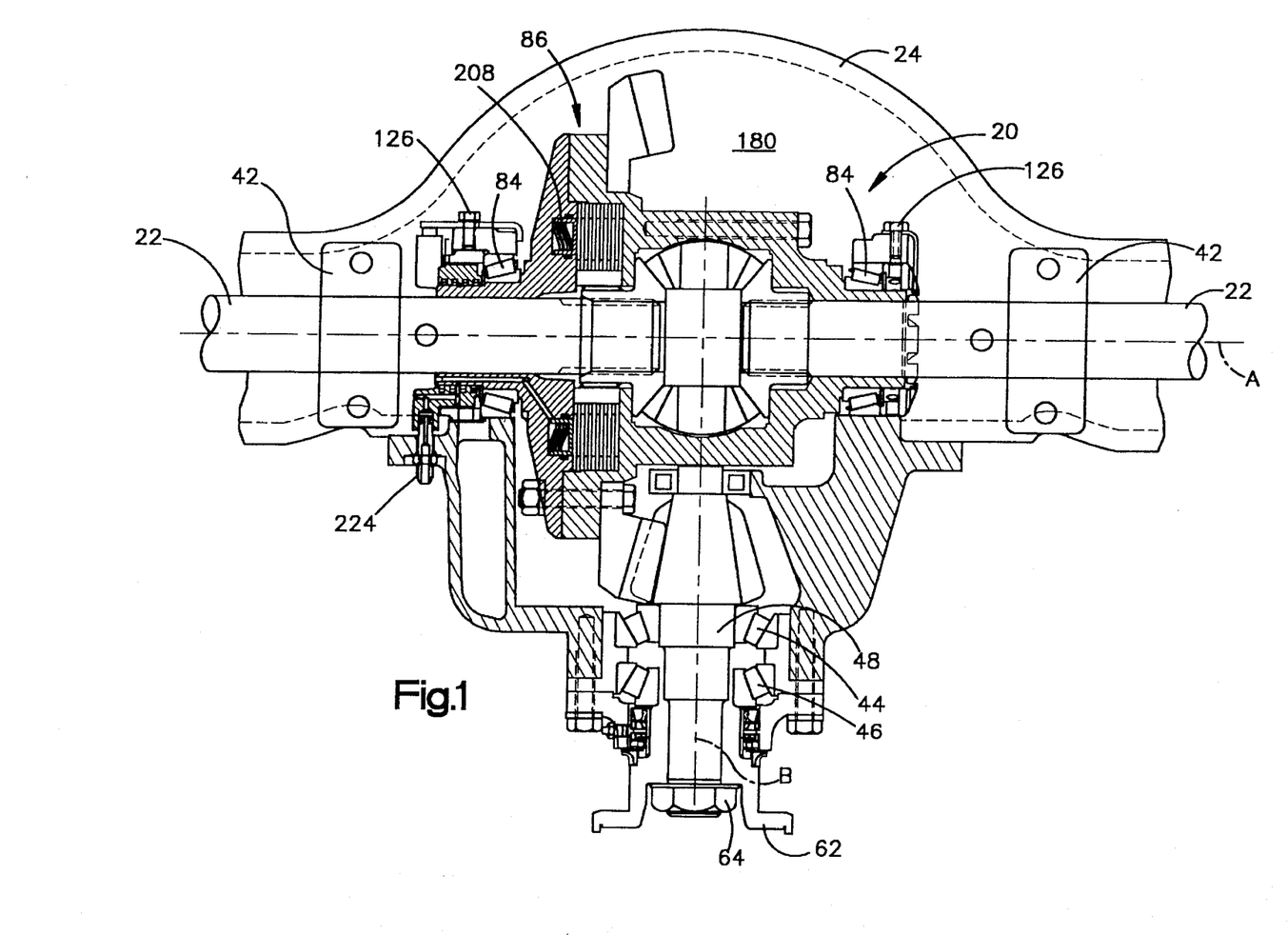
FIG. 1 is a cross-sectional view of a portion of a housing having a differential embodying the present invention.
Figure 2:
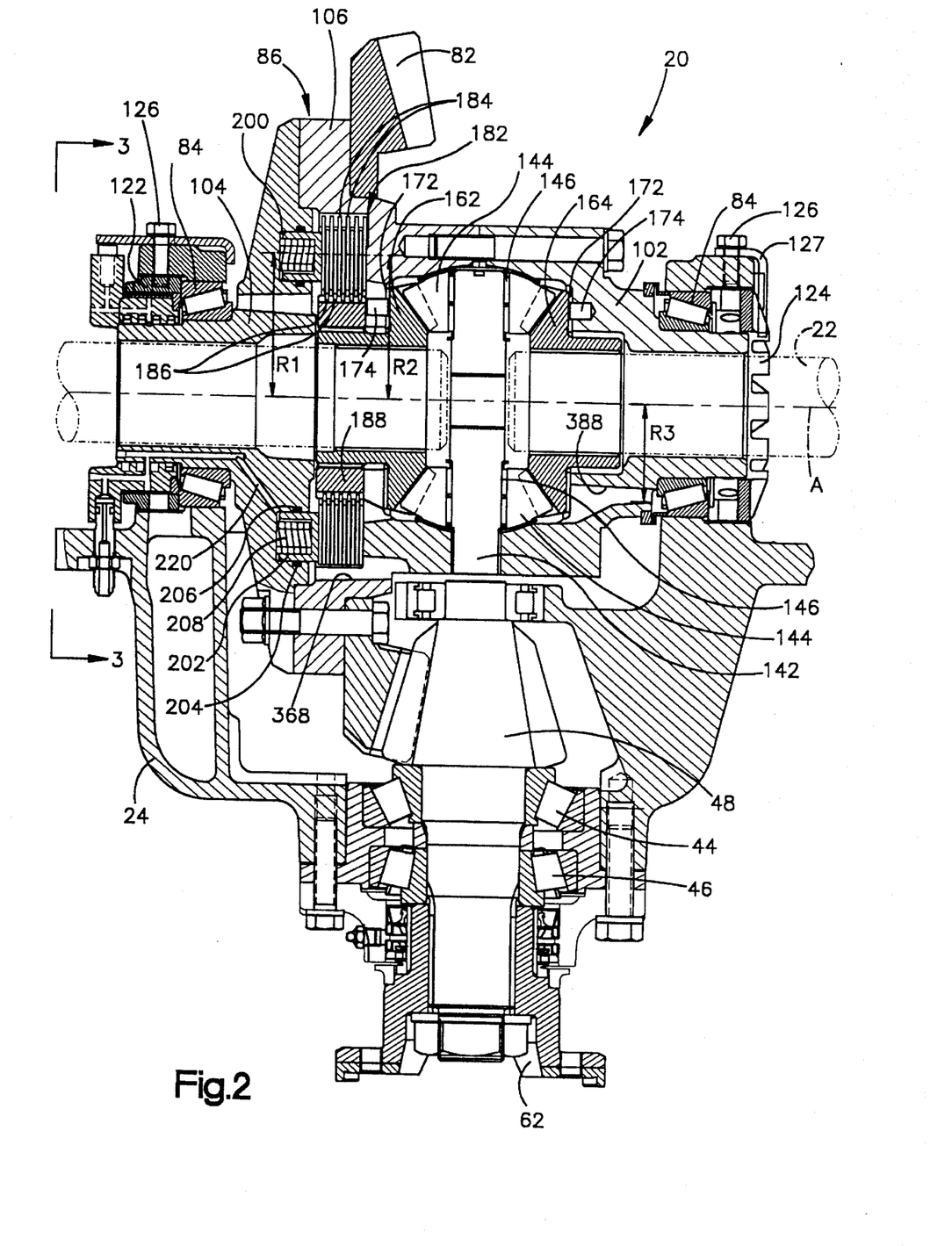
FIG. 2 is an enlarged cross-sectional view of the differential in FIG. 1.

The locked condition of the differential 20 is effected by actuation of the clutch assembly 182 by the application of another relatively high force to the piston 202. This force is considerably greater, than the a force of the biasing spring 208 and acts in addition to the biasing spring force. The biasing spring 208 may be at least one belville spring, or preferably several belville springs, as illustrated in FIG. 1, or may be a plurality of coil springs 208, as illustrated in FIG. 2. Regardless of the type of spring used, the spring 208 is located within an annular groove 210 (FIG. 7) formed in the annular piston 202. The spring bias of the spring 208 provides limited slip differential action and long life of the clutch assembly. The location of the mean radius of the biasing spring or springs 208 is approximately the same as the mean radius R1 of the piston 202 and the mean radius R2 of the clutch assembly 182. This location of the spring force and fluid force assures that such force does not cock the clutch assembly 182 and provides relatively even pressure distribution within the clutch assembly for an improved and relatively long service life.

Figure 3:
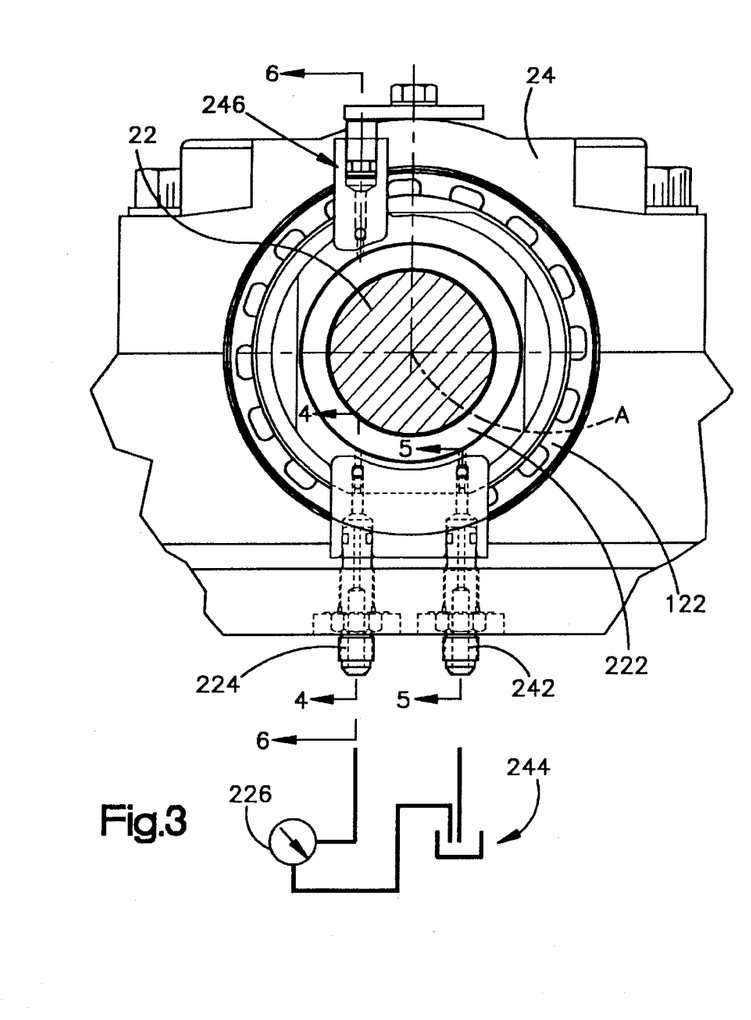
FIG. 3 is an enlarged side view of a portion of a seal retainer of the differential taken approximately along lines 3—3 in FIG. 2.
Figure 6:
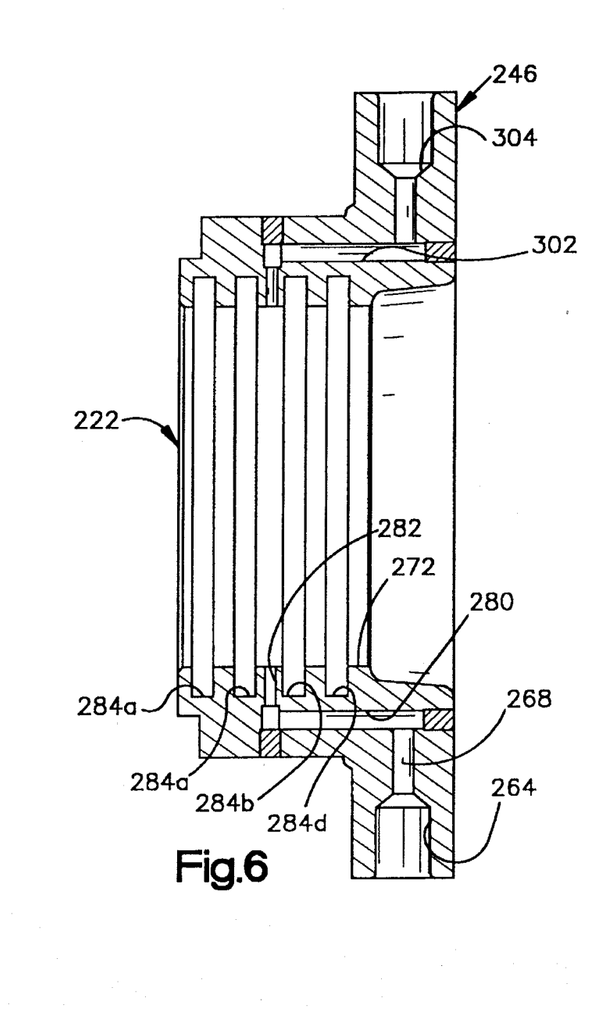
FIG. 6 is an enlarged cross-sectional view of the seal retainer in FIG. 3 illustrating a force balancing system, taken approximately along line 6—6 in FIG. 3.

As illustrated in FIG. 3, actuating fluid pressure from the external source is conducted into the differential case 86 through a seal retainer 222. The seal retainer 222 (FIG. 6) encircles an axially extending portion of the second differential case half 104. The second differential case half 104 has a continuous annular groove 248 (FIG. 4) formed in an outer circumferential surface of the differential case half 104.

The seal retainer 222 includes a fluid inlet coupling 224 (FIG. 3) in fluid communication with a fluid power source 226, such as a pump. The seal retainer 222 also includes a fluid outlet 242 in fluid communication with a reservoir tank 244 of the fluid power system. Pressurized fluid is conducted to the opening 200 for the piston 202 through a passage 220 (FIGS. 4 and 7) in the left differential case half 104. Fluid to the passage 220 is conducted from the external source 226 through the seal retainer 222.

Figure 4:
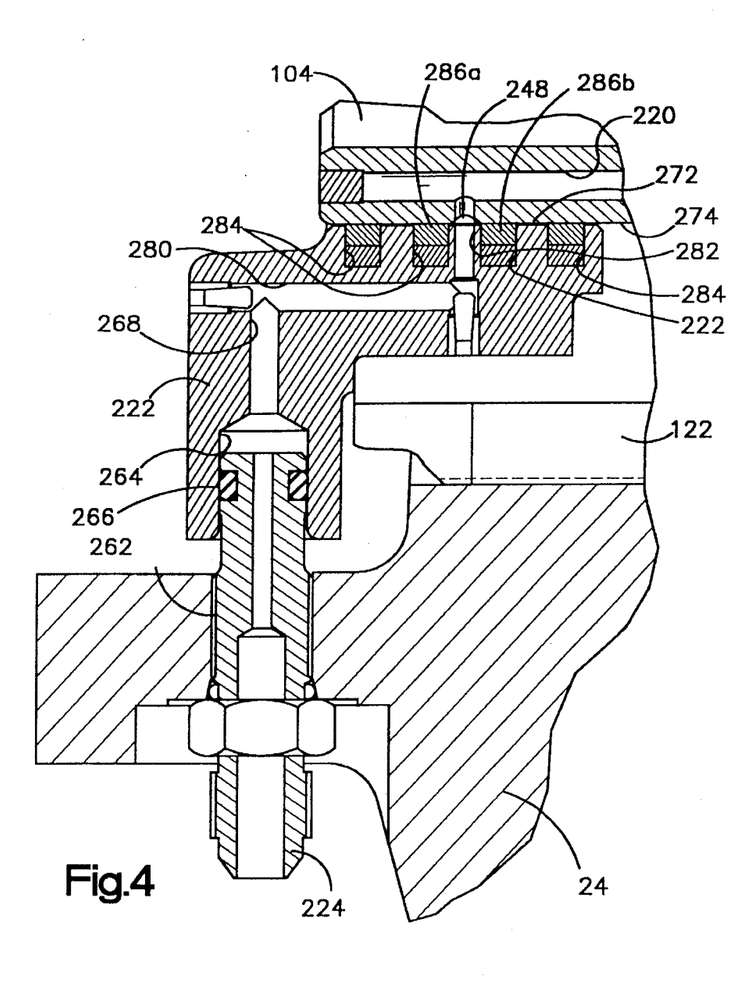
FIG. 4 is an enlarged cross-sectional view of a portion of the seal retainer taken approximately along line 4—4 in FIG. 3.

The fluid inlet connector 224 is connected to the housing 24 by a threaded connection 262 (FIG. 4). The fluid inlet connector 224 extends into an opening 264 in the seal retainer 222 and has a seal 266 to prevent fluid leakage at the interface. The opening 264 communicates with radially extending passage 268 in the seal retainer 222. The passage 268 communicates with axially extending passage 280 formed in the seal retainer 222. The axial passage 280 communicates with radial passage 282.

The inner cylindrical opening 272 extending through the seal retainer 222 closely fits the outer cylindrical surface 274 of the axially extending portion of the left differential case half 104. The seal retainer 222 (FIG. 6) includes four annular grooves 284 extending radially from the opening 272 and which are axially spaced apart along the seal retainer. Each groove 284 has an annular seal 286 received therein. The seals 286 prevent or inhibit fluid leakage axially outward between the surface of the opening 272 in the seal retainer 222 and the outer surface 274 of the axially extending portion of the left differential case half 104.

The end of the radial extending passage 282 is in communication with the opening 272 and is located between the intermediate pair of grooves 284. The end of the radially extending passage 282 in the seal retainer 222 is intended to axially align with the circumferential groove 248 in the outer surface 274 of the left differential case half 104. The groove 248 communicates with the passage 220 to conduct fluid pressure to the opening 200, piston 202 and clutch assembly 182. The annular groove 248 assures fluid communication between the passage 282 and passage 220 in the left differential case half 104 at all times during rotation of the differential case.

Since the fluid pressure introduced through the fluid inlet 224 is at a relatively high pressure, the seal retainer 222 would tend to move or cock radially relative to the differential case half 104 due to the relatively high fluid pressure. Such movement or cocking could result in premature wear of any seals, the differential case half axially extending portion or the seal retainer 222. The present invention has added a force compensating system 246 (FIGS. 3, 6 and 7) which offsets, minimizes and preferably eliminates relative movement or misalignment between the seal retainer 222 and the axial extending portion of the differential case half 104.

The surfaces of the passages and openings 264, 280 (FIG. 6) which face in a general radially outward direction would force the seal retainer 222, if not compensated, upwardly due to the fluid pressure acting on the surfaces even though the total area may be relatively small. That is because the fluid pressure is relatively high. The force compensating system 246 of the differential 20 embodying the present invention provides an offsetting surface area directed in an opposite facing direction than the passages and opening 264 and 280. The surfaces of a passage 302 and of an opening 304 face in a generally radial direction opposite to the passage 280 and opening 264. The total surface area of the inwardly facing surfaces of the passage 302 and the opening 304 is approximately equal to the total surface area of the inwardly facing surfaces of the passage 280 and the opening 264.

Figures 7, 9:
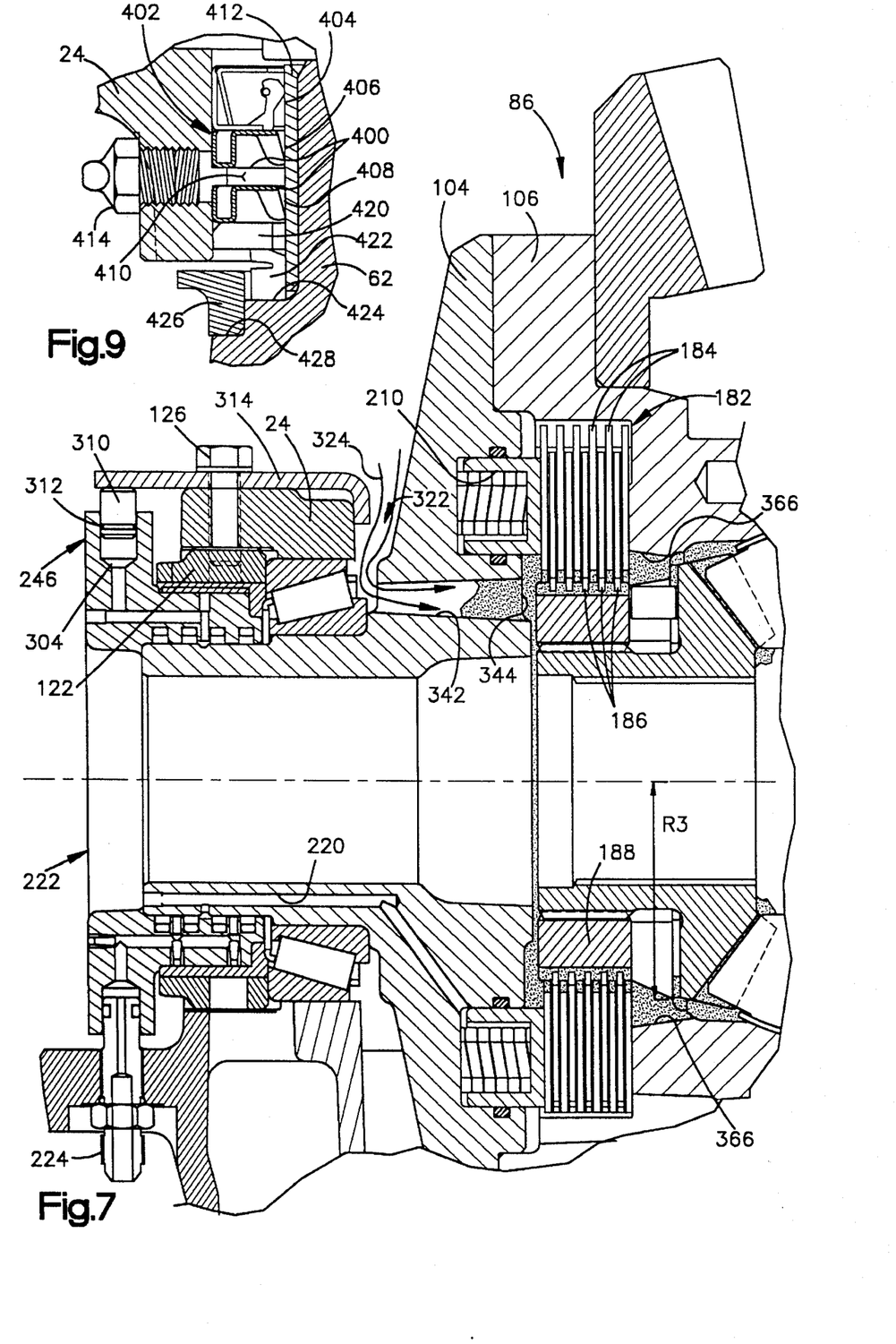
FIG. 7 is an enlarged cross-sectional view of a portion of the differential illustrating low speed lubrication and cooling of the differential gears as well as a fluid actuation system for the clutch assembly.
FIG. 9 is cross-sectional view of a portion of a pinion flange lubrication system.

When fluid pressure is conducted completely around the differential case half 104 through circumferential groove 248 the radially acting force on the retainer seal 222 in radially opposite directions is essentially offset. Thus, no resultant force is applied to the seal retainer 222 to cause radial movement or cocking relative to the left differential case half 104. The opening 304 receives a floating piston 310 (FIG. 7). A seal 312 is located around the piston 310 and is in engagement with the inner cylindrical surface of opening 304. Radial outward movement of the piston 310 is limited by a bracket 314 and bolt 316 attached to the housing 24. The piston and seal prevent fluid leakage from the opening 304. Thus, the pressure balancing feature of the present invention offsets such reactive forces.

Figure 5:
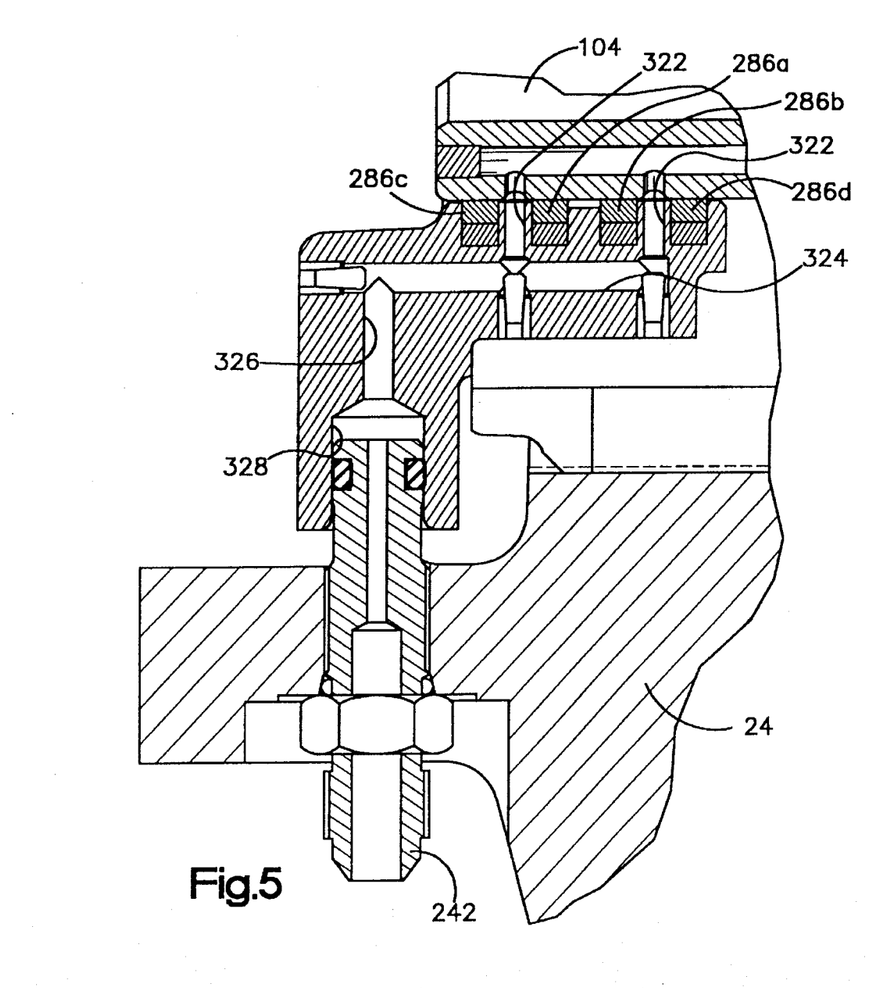
FIG. 5 is an enlarged cross-sectional view of another portion of the seal retainer, taken approximately along line 5—5 in FIG. 3.

Another feature of the present invention is illustrated in FIG. 5. Although the intermediate pair of seals 286A, 286B perform generally satisfactorily in preventing fluid leakage axially beyond the intermediate seals, some leakage can occur. As illustrated in FIG. 5, the present invention provides a drain system feature for capturing fluid leakage axially outward of the intermediate seals 286A, 286B. The drain system provides additional axially outermost seals 286C and 286D. Drain passages 320, 322 extend radially outward from between respective pairs of axially outermost seals 286C and 286A, 286B. The radially extending drain passages 320, 322 communicate with an axial extending passage 324 in the seal retainer 222 but circumferentially offset from passage 280. Axial passage 324 communicates with radially extending passage 326 which communicates with opening 328. The outlet connector 242 is threaded into the housing 24 and returns any fluid leakage axially outward of seals 286A and 286B to the reservoir tank 244 of the fluid power system.

This also assures that little or no fluid from the fluid power system becomes intermixed or lost in the housing reservoir or sump 180 which may tend to degrade the gear lubricant in the sump. Thus, integrity of gear lubricant in the housing sump 180 and the fluid in the fluid power system is assured. Mixture of the low viscosity power system fluid with gear lubricant may tend to allow damage to highly loaded gears meshing and to the pump.

Another feature of the present invention is a dual speed lubrication and cooling mechanism for the clutch assembly 182. Additional lubrication and cooling is desired because the clutch assembly 182 absorbs a relatively greater amount of energy due to the relatively high mechanical and fluid forces transmitted through the clutch assembly. As illustrated in FIG. 7, when the ring gear 82 is rotating at a relatively slow speed of approximately 200 revolutions a minute or less, gear lubricant located in the sump 180 is at a level high enough that low speed rotation of the ring gear draws gear lubricant into a space 322 between the differential 86 and the portion of the housing 24 supporting the differential 20. The lubricant flow 324 enters a passage 342 in the left differential case half 104. The passage 342 communicates with a chamber 344 formed between the clutch housing 106 and left differential case half 104. The lubricant accumulating in the chamber 344 passes between the clutch driver 188 and the friction plates 186 and then into a passage 366 to a radial outward level having a radius R3. The lubricant accumulated in the passages 344 and 366 is forced radially outwardly through the clutch assembly 182 to a passage 368 by centrifugal force due to the differential 20 rotating. This not only lubricates but cools the gears and clutch assembly 182 because the lubricant flowing from the housing sump is relatively cooler than the differential.

The lubricant accumulated in the passages 344 and 366 flows through the clutch assembly 182 and carries away heat by contact with the reaction plates 184 and clutch plates 186. The friction plates 186 (FIG. 10) include a steel plate 346 with friction material 348 extending axially from both sides of the steel plate. The friction material 348 extending from the steel plate 346, thus, define a plurality of passages 350 for conducting coolant. A plurality of teeth 362 extend radially inward from the steel plate 346 and engage outer splines on the clutch driver 188. A plurality of relatively large notches 364 are formed in the interior periphery of the friction plate 186. Each of the notches 364 has a radius R4 which is greater than the radius R5 of a radially outermost portion of a tooth 362. The radius R3 of the lubricant level is less than the radius R4 of the notches 364. Thus, lubricant can flow from the passages 344 and 366, between the inner surface of the notch 364 and the passages 350 to the passage 368 where the lubricant then returns to the housing sump. There is at least two passages 366 and two passages 368 formed in the clutch housing 106, but any suitable number of the passages will do.

Figure 8:
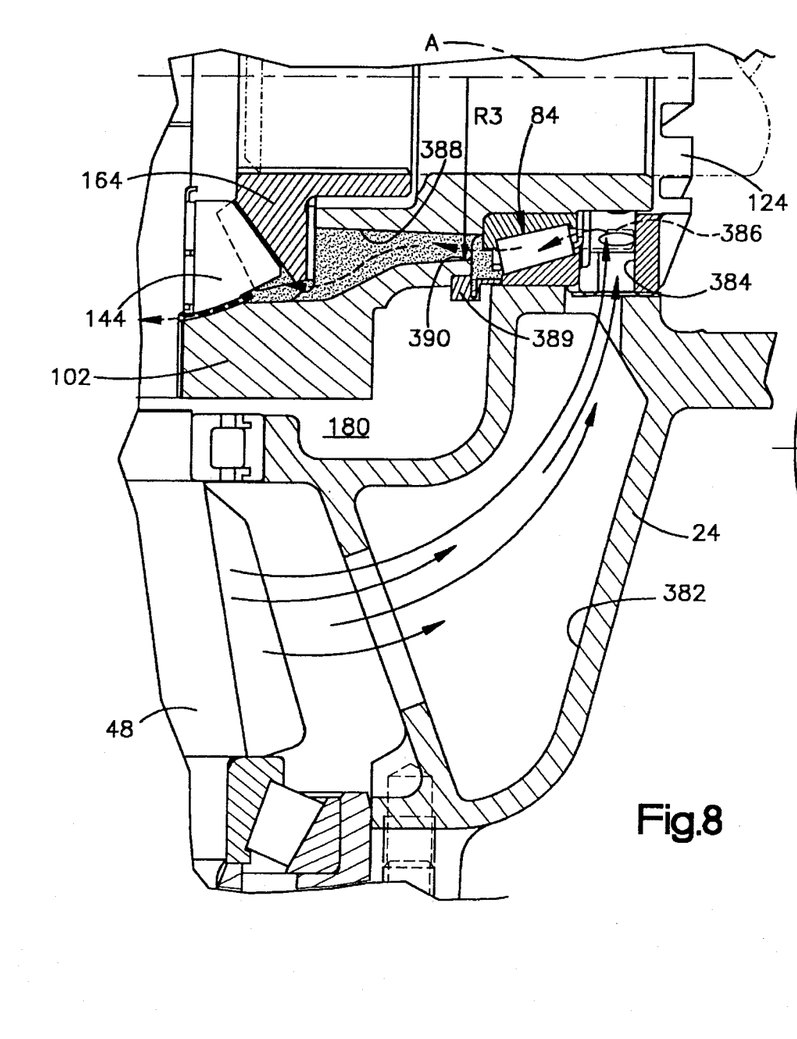
FIG. 8 is an enlarged cross-sectional view of another portion of the differential illustrating high speed lubrication of the differential gears.

Because of the relatively high operating speed of the drive gear 82, such as above 200 revolutions per minute, a separate and better high speed lubrication system is needed than is provided by the lubrication system at low speed. Drawing from the sump 180 is not sufficient as occurs at the low speed. Thus, a high speed lubrication system (FIG. 8) is provided by the present invention. Rotation of the drive pinion 48 at the relatively high rotational speeds throws off gear lubricant from engagement with the ring gear 82.

The lubricant thrown off from the drive pinion 48 during rotation enters a passage 382 in the housing 24. This passage leads to an opening 384 in the housing. The opening 384 is in fluid communication with a passage 386 formed in the bearing nut 124. The passage 386 is located such that it permits fluid flow to the right bearing 84, as viewed in FIG. 8. The tapered roller bearing 84 is unrestricted in non-roller positions to allow fluid flow and pumps fluid to a passage 388 and the first differential case half 102. A seal 389 is located between the first differential case half 102 and the housing sump 180 to prevent the loss of this lubricant flow. The outlet of passage 388 is located adjacent the meshing engagement of the differential pinions 144 and side gears 162, 164. The surface 390 of passage 388 has a radius R3 from the axis A which is less than the radius R4 of the notches 364 of the friction plate 186. Thus, cooling lubricant flows past the meshing differential pinions 144 and side gears 162, 164 to passage 366 (FIG. 7) to cool and lubricate the clutch assembly 182, as described above. The lubricant flows to the return passage 368 and is conducted to the housing sump 180.

It should be understood that the above described dual speed lubrication and cooling mechanism is operative to remove heat from the clutch assembly. Heat is generated due to the relative slipping that occurs between the reaction plates 184 and clutch plates 186 when the clutch is not locked, i.e., when it is operating as a limited slip differential. The lubricant flowing along the above described paths, carries away heat generated in the clutch assembly and transfers it to other parts of the differential or differential housing for ultimate dissipation.

Another feature of the differential 20 embodying the present invention is illustrated in FIG. 9. The improvement is directed to lubricating the pinion flange 62 as it rotates relative to housing 24. This is typically a location on the vehicle that has a relatively large amount of exposure to dirt, dust and debris which could cause excessive wear if the space between the pinion flange 62 and housing 24 was not sufficiently sealed and lubricated. Three annular seals 404, 406, 408 are located in axial spaced relationship between a portion of the pinion flange 62 disposed within a housing 24. A passage 410 for grease is located between the two axially outermost seals 406, 408 which are spaced apart by engagement with annular shoulder surfaces 400. A wear sleeve 412 is connected to and encircles the pinion flange 62 for the seals 404, 406, 408 to engage. This wear sleeve 412 is hardened and is intended as a sacrificial surface so the entire pinion flange 62 does not have to be discarded entirely. A fitting 414 communicates with the passage 410 introduces a grease lubricant between the wear sleeve 412 and the housing 24.

An annular thrust washer 420 is located axially outward of an axial outermost seal 408. A slinger 422 is located axially outward of the thrust washer 420 and between a shoulder portion 424 of the pinion flange 62 and the thrust washer. A dust shield 426 is located axially and radially outward of at least a portion of the slinger 422 and engages a second shoulder 428 of the pinion flange 62. The lubrication system 402 has a slinger 422 preventing entry of small debris particles and a dust shield 426 for preventing large dirt and debris particles from entering and contact the slinger. This such slinger 422 and dust shield 426 arrangement retains the seals lubrication between the wear sleeve 412 and housing 24 while preventing dirt, sand, water, dust and debris from entering.

From the above description of the preferred embodiment of the invention, those skilled in the art will perceive improvements, changes and modifications. Such improvements, changes and modifications within the skill of the art are intended to be covered by the appended claims.

Having described a preferred embodiment of the invention, I claim:

1. An improved locking differential for driving a pair of vehicle axles in which a housing supports the differential and the axles, the differential includes a case supported for rotation by the housing, the case supports at least one differential pinion, side gears are driven to rotate about an axis by the differential pinion, each side gear drives a respective axle wherein the improvement comprises:

an actuatable clutch movable between a locked position in which the case is fixed to the side gear to rotate the axles in unison and an unlocked position in which the axles may relatively rotate;

an annular piston located in the case engages the clutch and is movable to actuate the clutch, said annular piston including an annular recess formed therein and located in a direction facing away from said clutch;

spring means located within the annular recess in the piston for biasing the piston and clutch towards the locked position, whereby a limited slip function is provided in said differential when not said clutch is not in the locked position;

fluid power means in communication with the piston for applying a force greater than the force applied by said spring means, said force applied by said fluid power means being substantially coincident with, and additive to, said force applied by said spring means, said force operative to move the clutch from the unlocked position to the locked position; and a clutch drive having inner and outer splines, said inner splines of said clutch drive engageable with splines on the outer periphery of one of the side gears permitting relative axial movement therebetween, said outer splines of said clutch drive engageable with a portion of the clutch.

2. The improved differential set forth in claim 1 wherein said spring means comprises a belville spring located in said annular recess in the piston to exert a force between the piston and the case.

3. The improved differential set forth in claim 1 wherein said spring means comprises a plurality of coil springs each of which is located in said annular recess in the piston to exert a force between the piston and the case.

4. The improved differential set forth in claim 1 wherein said piston has a first mean radius, said clutch has a second mean radius and said spring means has a third mean radius, said first, second and third mean radii being substantially equal whereby a force applied by the spring means acts substantially at the same radial location on the piston at which the piston acts on the clutch and is additive to the force applied by the piston and whereby cocking of the piston is inhibited.

5. The improved differential set forth in claim 1 wherein said fluid power means comprises a seal retainer encircling an axial portion of the case, said seal retainer including means for balancing forces applied to the case during delivery of pressurized fluid to the piston to minimize misalignment of the axial portion of the case.

6. The improved differential set forth in claim 5 wherein said force balancing means comprises oppositely facing surfaces formed in said seal retainer being substantially equal in area to offset unevenly distributed forces applied within said seal retainer when fluid pressure is communicated to said seal retainer.

7. The improved differential set forth in claim 1 wherein said fluid power means comprises a seal retainer encircling an axial portion of the case and including four axially spaced annular seals located in respective annular grooves in said seal retainer, pressurized fluid being conducted between an intermediate pair of seals, any fluid leakage axially outward of said intermediate pair of seals is drained to a reservoir tank by fluid passage means having portions located between respective pairs of axially outermost seals.

8. An improved locking differential for driving a pair of vehicle axles, the differential includes a rotatable case, at least one differential pinion is supported by the case and meshes with side gears to drive the axles, a clutch assembly is carried by the case and connects a side gear with the case upon actuation, fluid power means actuates the clutch assembly to connect the case and side gear, wherein the improvement comprises:

the fluid power means including a seal retainer encircling an axially extending portion of the case, said seal retainer including means for evenly distributing forces applied to the axially extending portion of the case during delivery of pressurized fluid to the clutch assembly.

9. The improved differential set forth in claim 8 wherein said even force distributing means comprises oppositely facing surfaces formed in said seal retainer being substantially equal in area to offset oppositely directed forces acting within said seal retainer when pressurized fluid is delivered to the clutch assembly.

10. The improved differential set forth in claim 8 wherein said seal retainer further includes:

four annular grooves axially spaced apart;

four annular seals, each of said seals located in a respective annular groove in said seal retainer and engaging the axial extending portion of the case;

first fluid passage means in said seal retainer and located between an intermediate pair of seals to conduct pressurized fluid to the clutch assembly; and second fluid passage means located in said seal retainer and having portions located between respective pairs of axially outermost seals for draining any fluid leakage axially outward of said intermediate pair of seals to a reservoir tank.

11. An improved differential for driving a pair of vehicle axles, the differential includes a case supported for rotation in a housing about an axis, the case carries a ring gear, a rotatable drive pinion is supported by the housing and is in meshing engagement with the ring gear, a cross-shaft is supported by the case and receives a differential pinion meshing with a side gear to drive one of the axles, a clutch assembly having engageable surfaces is carried by the case and connects the side gear with the case upon actuation, fluid power means actuates the clutch assembly to engage the surfaces with a predetermined force and connect the case and side gear, wherein the improvement comprises:

first means for lubricating and cooling the engaged surfaces of the clutch assembly at high rotational speed of the ring gear; and second means for lubricating and cooling the engaged surfaces of the clutch assembly at high rotational speed of the ring gear, said second means utilizing lubricant thrown off from the drive pinion during rotation, said first means includes a first passage in the case conducting the lubricant to the clutch assembly, the clutch assembly includes at least one plate having a plurality of inwardly projecting teeth for splined engagement and connection with the side gear and at least one radial cutout of a radius greater than the largest radius of the teeth for permitting lubricant to flow through said clutch assembly to a second passage in the case and between the engaged surfaces of the clutch assembly.

12. The improved locking differential set forth in claim 11 wherein said second means includes a third first passage in the housing for conducting lubricant thrown off from the drive pinion to a bearing retaining member, said bearing retaining member having a fourth passage extending therethrough for conducting the lubricant to a bearing which supports a portion of the case, said bearing conducting and pumping the lubricant to a fifth passage formed in the case, said fifth passage in the case conducting the lubricant to an area adjacent the meshing surfaces of the differential pinion and side gear and to said second passage for flow between the engaged surfaces of the clutch assembly.

13. The improved locking differential set forth in claim 11 further including a sixth passage for draining the lubricant from the clutch assembly to a housing sump.

14. The improved locking differential set forth in claim 11 wherein said fifth passage is located in the case at a radial dimension relative to the axis of rotation which is less than the inner radius of the clutch assembly.

15. An improved differential for driving a pair of vehicle axles, the differential includes a case supported for rotation in a housing, the case and carries a ring gear, a rotatable drive pinion is supported by the housing and meshes with the ring gear, a flange is in splined engagement with the drive pinion and has a portion supported for rotation by the housing, means for lubricating between the relatively rotating surfaces of the flange and the housing, wherein the improvement comprises said lubricating means including:

three annular seals located between the flange and the housing;

a passage having an end portion located between a spaced apart pair of said seals;

a wear sleeve connected to the flange for said seals to engage;

a fitting communicating with said passage for introducing lubricant between said wear sleeve and the housing;

an annular thrust washer located axially outward of an axial outermost seal;

a slinger located axially outward of said thrust washer; and a dust shield located axially and radially outward of at least a portion of said slinger.

16. An improved locking differential for driving a pair of vehicle axles in which a housing supports the differential and the axles, the differential includes a case supported for rotation by the housing, the case supports at least one differential pinion, side gears are driven to rotate about an axis by the differential pinion, each side gear drives a respective axle wherein the improvement comprises:

an actuatable clutch movable between a locked position in which the case is fixed to the side gear to rotate the axles in unison and an unlocked position in which the axles may relatively rotate;

an annular piston located in the case engages the clutch and is movable to actuate the clutch, said annular piston including a force receiving portion formed therein and located in a direction facing away from said clutch;

spring means located adjacent said force receiving portion and operative to bias the piston and clutch towards the locked position, whereby a limited slip function is provided in said differential when clutch is not in the locked position;

fluid power means in communication with the piston for applying a force greater than the force applied by said spring means, said force applied by said fluid power means being substantially coincident with, and additive to, said force applied by said spring means, said force operative to move the clutch from the unlocked position to the locked position; and a clutch drive having inner and outer splines, said inner splines of said clutch drive engageable with splines on the outer periphery of one of the side gears permitting relative axial movement therebetween, said outer splines of said clutch drive engageable with a portion of the clutch.

17. An improved locking differential for driving a pair of vehicle axles in which a housing supports the differential and the axles, the differential includes a case supported for rotation by the housing, the case supports at least one differential pinion, side gears are driven to rotate about an axis by the differential pinion, each side gear drives a respective axle wherein the improvement comprises:

an actuatable clutch movable between a locked position in which the case is fixed to the side gear to rotate the axles in unison and an unlocked position in which the axles may relatively rotate;

an annular piston located in the case engages the clutch and is movable to actuate the clutch, said annular piston including a force receiving portion formed therein and located in a direction facing away from said clutch;

spring means located adjacent said force receiving portion and operative to bias the piston and clutch towards the locked position, whereby a limited slip function is provided in said differential when clutch is not in the locked position;

fluid power means in communication with the piston for applying a force greater than the force applied by said spring means, said force applied by said fluid power means being substantially coincident with, and additive to, said force applied by said spring means, said force operative to move the clutch from the unlocked position to the locked position; and a clutch drive having inner and outer splines, said inner splines of said clutch drive engageable with splines on the outer periphery of one of the side gears permitting relative axial movement therebetween, said outer splines of said clutch drive engageable with a portion of the clutch;

said piston having a first mean radius, said clutch having a second mean radius and said spring means having a third mean radius, said first, second and third mean radii being substantially equal whereby a force applied by the spring means acts substantially at the same radial location on the piston at which the piston acts on the clutch and is additive to the force applied by said piston and whereby piston cocking is inhibited.

* * * * *

UNITED STATES PATENT AND TRADEMARK OFFICE
CERTIFICATE OF CORRECTION

PATENT NO.  : 5,520,589
DATED       : May 28, 1996
INVENTOR(S) : Gregory T. DeWald and Charles D. Schaber It is certified that error appears in the above-indentified patent and that said Letters Patent is hereby corrected as shown below:

In claim 11, at column 12, line 14, the word "high" should be changed to "low."

Signed and Sealed this

First Day of April, 1997

*Attest:*

BRUCE LEHMAN

*Attesting Officer*    Commissioner of Patents and Trademarks